United States Patent
Dembowsky et al.

(10) Patent No.: US 7,699,555 B2
(45) Date of Patent: Apr. 20, 2010

(54) MOUNTING ASSEMBLY WITH RELEASABLE LOCK

(75) Inventors: Hans-Joachim Dembowsky, Hamburg (DE); Hans-Ullrich Figge, Schloss-Holte-Stukenbrock (DE); Martin Jodeleit, Bielefeld (DE)

(73) Assignee: Bollhoff Verbindungstechnik GmbH, Bielefeld (DE)

( * ) Notice: Subject to any disclaimer, the term of this patent is extended or adjusted under 35 U.S.C. 154(b) by 462 days.

(21) Appl. No.: 11/799,433

(22) Filed: May 1, 2007

(65) Prior Publication Data

US 2007/0257468 A1 Nov. 8, 2007

(30) Foreign Application Priority Data

May 4, 2006 (DE) ............ 20 2006 007 180

(51) Int. Cl.
*B25G 3/18* (2006.01)
*F16D 1/108* (2006.01)

(52) U.S. Cl. ............... 403/322.3; 403/323; 403/329; 403/343

(58) Field of Classification Search ............ 403/199, 403/201, 19, 20, 322.1, 323, 324, 322.3, 403/329, 343, 350; 362/549
See application file for complete search history.

(56) References Cited

U.S. PATENT DOCUMENTS

| 4,182,532 A | * | 1/1980 | Walker, Sr. | .............. | 296/210 |
| 4,285,103 A | * | 8/1981 | Inamoto | ............... | 411/508 |
| 4,899,262 A | * | 2/1990 | Hammond et al. | .......... | 362/549 |
| 5,040,915 A | * | 8/1991 | Stuart et al. | .............. | 403/322.3 |
| 5,664,445 A | * | 9/1997 | Chang | .............. | 70/34 |
| 6,345,946 B1 | * | 2/2002 | Mainini et al. | ............. | 411/508 |
| 6,796,625 B2 | * | 9/2004 | Lauchner et al. | ........ | 312/334.46 |
| 7,401,994 B2 | * | 7/2008 | Kojima et al. | .............. | 403/326 |
| 7,404,688 B2 | * | 7/2008 | Schwab | .............. | 403/329 |
| 2005/0074280 A1 | * | 4/2005 | Chen | .............. | 403/329 |
| 2006/0032016 A1 | * | 2/2006 | Dembowsky et al. | .......... | 16/82 |

FOREIGN PATENT DOCUMENTS

| AT | 381992 B | 4/1983 |
| DE | 2638463 A1 | 3/1978 |
| DE | 19544623 A1 | 6/1997 |
| DE | 202004012733 U1 | 11/2004 |
| DE | 202005006376 U1 | 7/2005 |
| DE | 202005008060 U1 | 8/2005 |
| FR | 2833661 | 12/2001 |
| FR | 2861439 | 10/2003 |

* cited by examiner

*Primary Examiner*—Daniel P Stodola
*Assistant Examiner*—Joshua T Kennedy
(74) *Attorney, Agent, or Firm*—Hiscock & Barclay, LLP

(57) ABSTRACT

A mounting assembly for releasably mounting a rear light member to a body member of a vehicle. The mounting assembly comprises a locking member. The locking member includes a sleeve-like mounting portion adapted to be fixed to the support member, and a first locking portion integrally joined to the mounting portion. The first locking portion is adapted to snappingly engage a matingly shaped second locking portion of the structural member for retaining it. The mounting assembly further comprises a release pin axially slidably in the mounting portion of the locking member. The release pin has a shaft portion axially project from the sleeve-shaped mounting portion and is adapted to be axially displaced for releasing the two locking portions from being snappingly engaged.

15 Claims, 4 Drawing Sheets

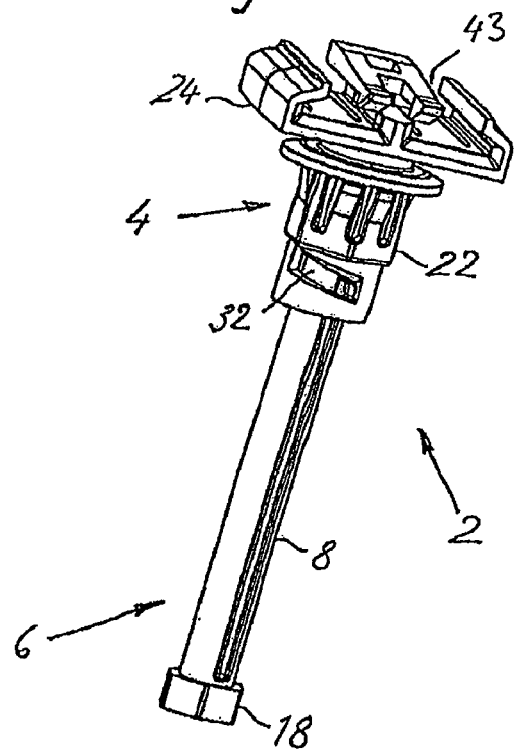
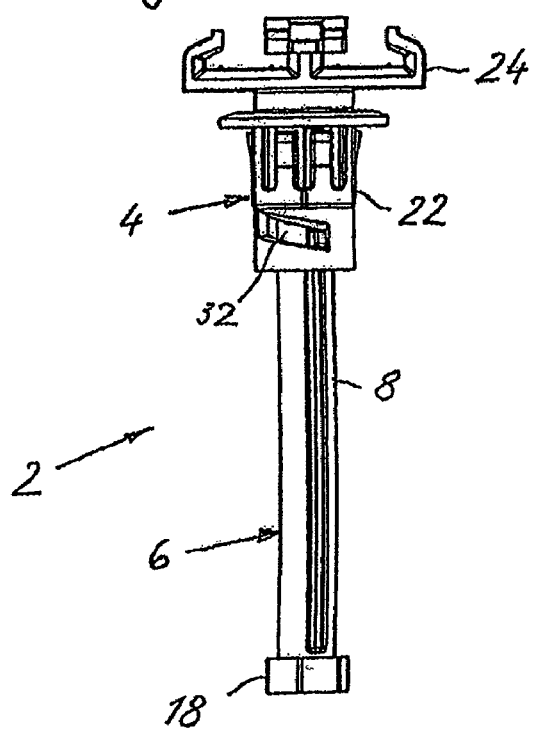

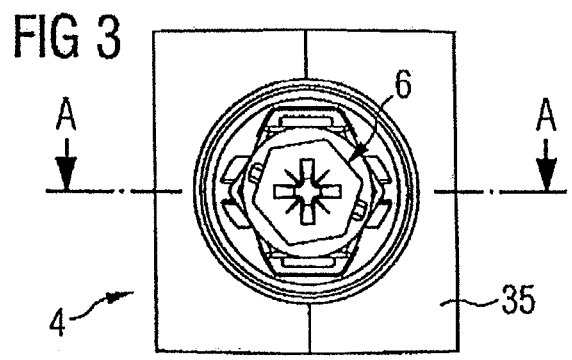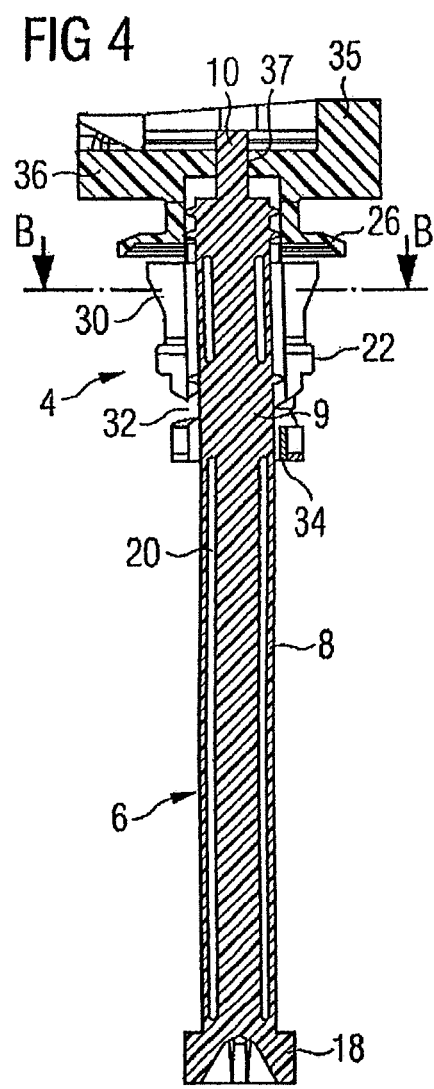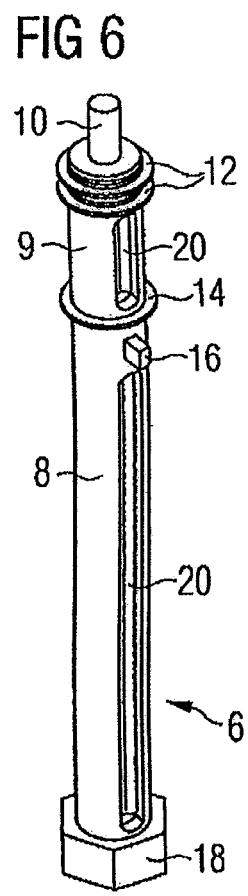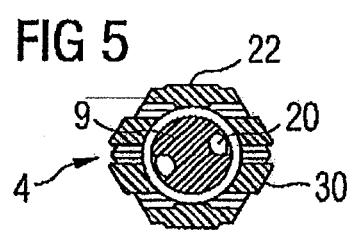

MOUNTING ASSEMBLY WITH RELEASABLE LOCK

BACKGROUND OF THE INVENTION

The present invention relates to a mounting assembly for releasably mounting a structural member to a plate-shaped support member, in particular a rear light member to a body member of a vehicle. In particular, this invention relates to a mounting assembly, in which the releasable mount of the structural member occurs through a lock on the support member.

A great variety of these types of mounting assemblies are known. The lock serves to connect together the structural member and support member in a normal operating state and to release the connection between the structural member and the support member if required.

In order to release the lock, it must be normally accessible. However, in certain applications, for example when the mounting assembly serves to mount a rear light member to a body member of a vehicle, the lock is not accessible or is difficult to access.

SUMMARY OF THE INVENTION

A primary object of the present invention is to provide a mounting assembly for releasably mounting a structural member to a plate-shaped support member by means of a lock, in which the lock can be released without incident despite poor accessibility.

According to the invention, the mounting assembly comprises a locking member including a sleeve-like mounting portion adapted to be fixed to said support member and a locking portion integrally joined to said mounting portion, said locking portion being adapted to snappingly engage a matingly shaped locking portion of said structural member for retaining said structural member, and a release pin axially slidably guided in said sleeve-shaped mounting portion of said locking member, said release pin having a shaft portion axially project from said sleeve-shaped mounting portion and being adapted to be axially displaced for releasing said first and second locking portions from being snappingly engaged.

The section of the release pin protruding from the mounting portion of the locking member can be made to be any length so that the connection between the support member and the structural member to be mounted can be released without any problem, even if the locking engagement lies in an otherwise inaccessible area. The mounting assembly designed according to the invention can thus be used in particular for mounting a rear light member to a vehicle body, even though the mounting assembly can be used in other areas.

In another embodiment of the invention, the release pin is connected with the locking member via a cam guide, which converts a rotational movement of the release pin into an axial movement of the release pin. Thus, only a rotational movement of the release pin is required to release the locking engagement, which can be performed manually by means of a lathe tool if necessary.

Another embodiment of the invention provides that the locking portion of the locking member has: a profiled body for receiving the locking portion of the structural member to be mounted and a locking arm spring-connected on the profiled body for locking with the locking portion of the structural member to be mounted. In this embodiment of the locking portion, the locking arm spring-connected on the profiled body is moved via an axial adjustment movement of the release pin, wherein the locking and thus the connection between the structural member and the support member is released. This constructive solution is simple and reliable.

The mounting portion arranging the locking member on the support member can be designed as in German utility model DE 20 2004 012 733.4. However, other solutions for arranging the mounting portion of the locking member on the support member are also possible.

Advantageously, the locking member as well as the release pin are designed as a single piece and are made by injection molding. They are preferably made of plastic, even if they can also be made of other materials.

Further advantageous embodiments of the invention are defined in the dependent claims.

An exemplary embodiment of the invention is explained in greater detail based on the drawings.

BRIEF DESCRIPTION OF THE DRAWINGS

FIG. 1 shows a perspective view of a mounting arrangement designed according to the invention made of a locking member and release pin;

FIG. 2 shows a side view of the mounting assembly in FIG. 1;

FIG. 3 shows an end view of the mounting assembly in FIG. 1;

FIG. 4 shows a sectional view in the direction of arrows A-A in FIG. 3;

FIG. 5 shows a sectional view in the direction of arrows B-B in FIG. 4;

FIG. 6 shows a perspective view of the release pin of the mounting arrangement in the previous figures;

DETAILED DESCRIPTION OF A PREFERRED EMBODIMENT OF THE INVENTION

Figure 7:
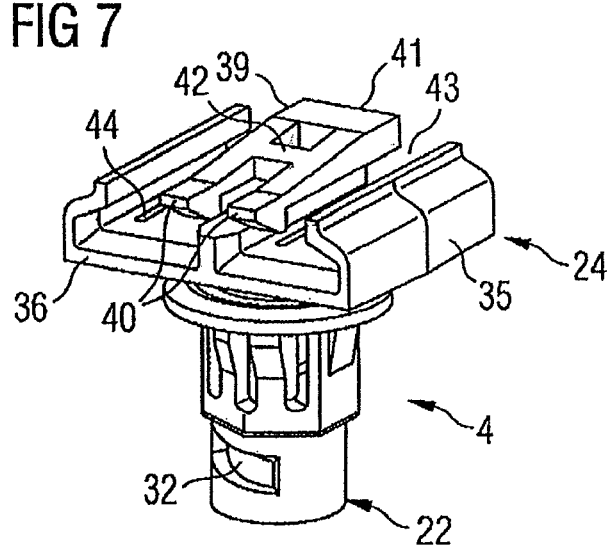
FIG. 7 shows a perspective view of the locking member of the mounting assembly in FIGS. 1 through 5.

The mounting assembly 2 shown in FIGS. 1 through 5 comprises a locking member 4 and a release pin 6. As can be seen in these figures, the locking member 4 and the release pin 6 form a pre-assembled unit, which serves to mount a structural component B in the form of a rear light housing (FIGS. 10, 11) to a support member T in the form of a body plate (FIG. 9) in the exemplary embodiment shown.

The locking member 4 and the release pin 6 are shown as individual parts in FIGS. 6 through 9. They are each designed as a single piece and are preferably made of plastic, even if they could in general be made of other materials. The plastics are coordinated and are made e.g. of an impact-resistant plastic like polyamide with a fiber reinforcement or another thermoplastic resin. Both the locking member 4 and the release pin 6 are advantageously made by injection molding.

The release pin 6 shown in FIG. 6 has the shape of a shaft with a comparably long shaft portion 8 and a shorter shaft portion 9. An axially running projection 10 with a decreased diameter is formed on the free end of the shaft portion 9. The shaft portion 9 is also provided with annular ribs 12, 14, of which the ribs 12 are designed as sealing and guiding ribs and the rib 14 is designed as a guiding rib.

The shaft portion 9 of the release pin 6 is also provided with two diametrically opposed cams 16, which are designed as protrusions protruding radially from the shaft portion 9. The end of the release pin 6 facing away from the projection 10 is provided with a drive feature 18 for enabling rotation of the release pin 6. In the exemplary embodiment shown, the drive feature consists of a hexagon; however, it shall be understood that the drive feature can also be designed in a different manner, for example as a screw driver slot, for the arrangement of a tool.

In the exemplary embodiment shown, the release pin 6 is provided with longitudinally running grooves 20 (also see the section in FIG. 5), which serve to save material and have no other function.

Figure 8:
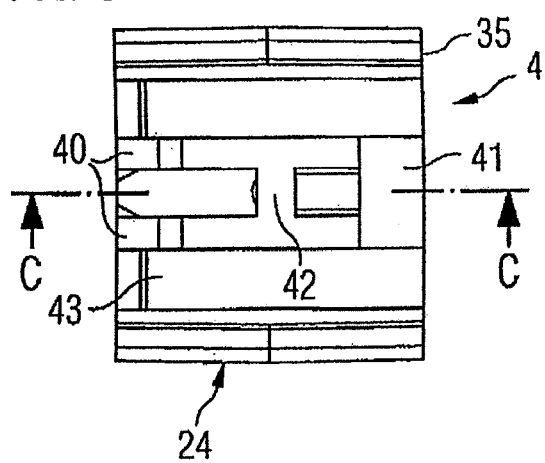
FIG. 8 shows a view from the top of the locking member in FIG. 7.
Figure 9:
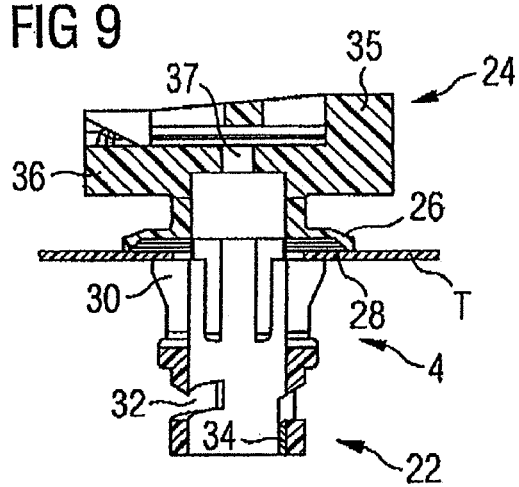
FIG. 9 shows a sectional view in the direction of arrows C-C in FIG. 8 with indicated support member.
Figure 10:
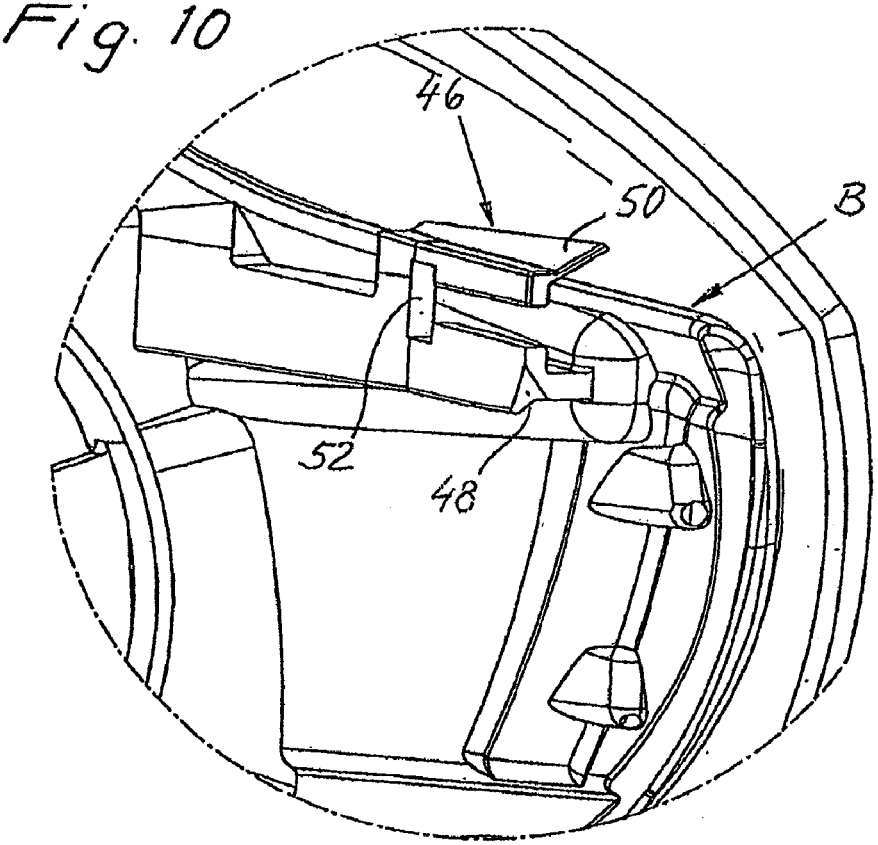
FIG. 10 shows a section of a perspective representation of a structural member, which is to be mounted on the support member T using the mounting assembly in the previous figures.
Figure 11:
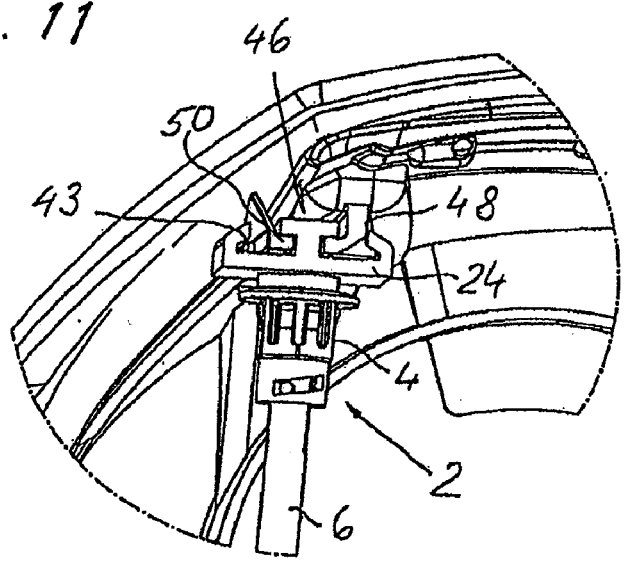
FIG. 11 shows a section of a perspective view of the mounting assembly and the structural member connected with it (without support member).

The locking member 4 shown in FIGS. 7 through 9 consists of a sleeve-like mounting portion 22 and a locking portion 24 integrally joined with it. The mounting portion 22 serves to mount the locking member 4 on the support member T (FIG. 9), while the locking portion 24 serves to releasably connect (lock) it with structural member B (FIGS. 10, 11).

The mounting portion 22 of the locking member 4 is designed as a generally sleeve-like part. In the area, in which the mounting portion 22 is arranged on the support member T (FIG. 9), the mounting portion is designed as in German utility model DE-GM 20 2004 012 733.4. It has an annular flange 26, which has a concave arcuate shape (bottom of FIG. 9). Its outer periphery is provided with a sealing lip 28 that is pointed axially downwards.

An intermediate portion, which has a polygonal profile corresponding with the contour of the receiving opening of the support member T, attaches to the annular flange 26. This intermediate portion is provided with diametrically opposed window-like openings, in which several spring legs 30 are arranged.

The spring legs 30 are shaped on their axial ends on the intermediate portion, while they are otherwise distanced from the material of the intermediate portion such that they can be recurved radially inwards. The spring legs 30 have a specified distance from the bottom side of the annular flange 26 on their upper axial ends so that the support member T can be clamped between the sealing lip 28 of the annular flange 26 and the front surfaces of the spring leg. The spring legs 30 are also provided with insertion bevels on their outer radial edges.

The mounting portion 22 is also provided with two diametrically opposed, helically extending cam slots 32, which extend approx. 90° in the circumferential direction in the exemplary embodiment shown. Together with the cams 16 of the release pin 6, the cam slots 32 form a cam guide, which converts a rotational movement of the release pin 6 into an axial movement of the release pin, as will be explained in greater detail.

In order to be able to insert the cams 16 of the release pin 6 into the cam slot 32 of the locking member 4, the mounting portion 22 is provided on the inside with axially extending inclined surface 34, as indicated in FIGS. 4 and 9.

The locking portion 24 of the locking member 4 consists of a profiled body 35, which has an approximately rectangular, almost square outline and is shaped on its bottom side on the sleeve-like mounting portion 22. The profiled body 35 has a bottom surface 36, which lies in a plane running perpendicular to the longitudinal axis of the mounting assembly. A through-hole 37 (FIG. 9), through which the projection 10 of the release pin 6 extends, is formed in the middle of the bottom surface 36 (FIG. 4).

A locking arm 39, which is pin-jointed on its one end 41 with the bottom surface 36 of the profiled body 35 and from there transitions into two spring-released locking hooks 40, is provided in the central area of the profiled body 35. The two locking hooks 40 are connected by a central cross web 42, on the bottom side of which the projection 10 engages the release pin 6.

Lateral portions of the profiled body 35 form with the centrally arranged locking arm 39 two profiled grooves 43, which have an approx. T-shaped profile in the exemplary embodiment shown, running diagonal to the longitudinal axis of the mounting assembly. The profiled body 35 and the locking arm 39 are designed as mirror images with respect to a plane running through the axis of the mounting assembly. The profiled grooves 43 are thus also mirror images of each other with respect to this axial plane. Ribs 44 running parallel to the profiled grooves 43, the purpose of which will be explained in greater detail, are provided on the top side of the bottom surface 36.

The structural member (FIGS. 10, 11) to be mounted on the support member T is provided with a locking portion 46 adjusted for the profiled body 35 of the locking member 4. As shown in FIGS. 10 and 11, the locking portion 46 of the structural member B consists of two profiled ledges 48, 50, of which the profile ledge 48 has a T-shaped profile and the profiled ledge 50 has an L-shaped profile. The shape of the profiled ledges 48, 50 is selected such that they can be inserted into the profiled grooves 43 of the profiled body 35. The end of the profiled ledges 48, 50 is provided with locking depressions 52, into which can lock the locking hooks 40 of the locking arm 39 of the locking member 4.

The pre-assembly of the mounting assembly 2 (FIGS. 1 through 5) will now be described first. During pre-assembly, the release pin 6 with the projection 10 in front is inserted into the sleeve-like mounting portion 22 of the locking member 4. The cams 16 of the release pin 6 hereby glide along the inclined surfaces 34 of the locking portion 2 (FIGS. 4 and 9), whereby the elastically malleable, sleeve-like mounting portion 22 of the locking member 4 is expanded in an oval-like manner until the cams 16 snap into the cam slots 32. With this combining movement, the projection 10 of the release pin 6 reaches into the central through-hole 37 on the bottom surface 36 of the locking portion 24.

On the inside of the sleeve-like mounting portion 22 of the locking member 4, the release pin 6 is guided through the annular ribs 12 and 14 such that the release pin 6 is both axially displaceable and pivotable within the sleeve-like mounting portion 22 of the locking member 4. As mentioned previously, the cams 16 and the cam slots 32 form a cam guide, which converts a rotational movement of the release pin 6 into an axial movement of the same. At least the ribs 12 are oversized with respect to the inner diameter of the sleeve-like mounting portion 22 in order to exert a sealing effect in additional to its guide function.

The mounting assembly 2 pre-assembled in this manner can now be attached to the support member t (body plate, FIG. 9). For this purpose, the mounting assembly 2 is inserted from above into the receiving opening of the support member T. The mounting portion 22 of the locking member 4 is hereby aligned with the polygonal contour of the receiving hole of the support member T. The spring legs 30 are recurved radially inwards during this insertion procedure. Once the sealing lip 28 of the annular flange 26 has been installed on the support member T, the annular flange 26 is bent up slightly due to further axial pressure on the mounting assembly under elastic deformation such that the distance between the sealing lip 28 and the front surface of the spring legs 30 increases correspondingly. The spring legs 30 can now spring back into their initial position. If the axial pressure on the mounting assembly 2 is then released, the support member T is clamped between the annular flange 26 and the spring legs 30 due to the elastic prestress of the annular flange 26. The mounting assembly 2 is thus arranged on the support member T.

The structural member B (rear light housing) can now be connected with the locking member 4. For this purpose, the profiled ledges 48, 50 of the locking portion 46 of the structural member B (FIGS. 10, 11) are laterally inserted into the profiled grooves 43 of the profiled body 35 until the locking hooks 40 snap into the locking depressions 52. The locking portion 46 of the structural member B and the locking portion 24 of the locking member 4 arranged on the support member T are thereby locked together, whereby the structural, member B (rear light housing) is detachably mounted on the support member T (body plate).

Although the profiled ledges 48 and 50 of the locking portion 48 on structural member B have unequal profiles for reasons of space and production limitations, the mounting assembly 2 can be used for the rear lights on both the left and right sides of a vehicle. This is enabled in that the profiled body 35 of the locking arm 39 and thus the profiled grooves 43 are designed as mirror images of each other on an axial plane.

The ribs 44 provided on the bottom surface 36 of the profiled body 35 counterbalance production tolerances of the locking member 4 and/or the structural member B, thereby ensuring a tight, clatter-free fit of the structural member B on the locking member 4.

The ribs 12 of the release pin 6 functioning as sealing ribs on one hand and the sealing lip 28 on the annular flange 26 of the locking member 4 on the other hand ensure the proper sealing between the inside and outside of the support member T (body plate).

If the structural member B is detachably connected with the support member T in this manner, the release pin 6 with its shaft portion 8 protrudes beyond the locking member 4 into the interior of the vehicle. The length of the shaft portion 8 of the release pin 6 is sized such that the drive feature 18 of the release pin 6 is comfortably accessible for the arrangement of a tool (not shown).

If the release pin 6 is now turned ¼ of a turn using a corresponding tool, the release pin 6 and thus its projection 10 are axially displaced due to the cam guide 16, 32. The axial displacement of the release pin 6 causes the projection 10 to release the locking arm 39 of the locking member 4, whereby the locking hooks 40 are moved out of the locking depressions 52. The locking engagement between the structural member B and the mounting assembly 2 is thereby released so that the structural member B can be removed. In the exemplary embodiment shown, the rear lights can thus be replaced for example.

Even if the locking connection between the mounting assembly 2 and the structural member B is not directly accessible when installed, the locking connection can easily be released via the release pin 6. The re-mounting of the structural member B on the mounting assembly 2 then takes place again in the manner described above.

We claim:

1. A mounting assembly for releasably mounting a structural member to a plate-shaped support member, said mounting assembly comprising:

a locking member including a sleeve-like mounting portion adapted to be fixed to said support member, and a first locking portion integrally joined to said mounting portion, said first locking portion being adapted to snappingly engage a matingly shaped second locking portion of said structural member for retaining said structural member, and a release pin axially slidable in said sleeve-shaped mounting portion of said locking member, said release pin having a shaft portion axially project from said sleeve-shaped mounting portion and, wherein said release pin is connected to said locking member via a cam guide having at least one cam follower provided on said release pin and at least one helically extending cam slot through the wall of said sleeve-like mounting portion to transform rotational movements of said release pin into axial movements of said release pin for releasing said first and second locking portions from being snappingly engaged for releasing said first and second locking portions from being snappingly engaged.

2. A mounting assembly as defined in claim 1 wherein an axially extending inclined surface is provided at an internal wall of said locking member for enabling insertion of said cam follower into said cam slot.

3. A mounting assembly as defined in claim 1 wherein said release pin has an end remote from said locking member and provided with a drive feature for enabling rotation of said release pin.

4. A mounting assembly as defined in claim 1 wherein said release pin is sealingly guided at an internal periphery of said sleeve shaped mounting portion of said mounting member by annular ribs.

5. A mounting assembly as defined in claim 1 wherein said first locking portion of said locking member includes a profiled body for receiving said second locking portion of said structural member, and a locking arm resiliently and pivotally connected to said profiled body for snappingly engaging said second locking portion of said structural member.

6. A mounting assembly as defined in claim 5 wherein said locking arm is disposed in a central area of said profiled body and includes a pair of locking hooks which cooperate with locking depressions at said second locking portion of said structural member for providing locking engagement therebetween.

7. A mounting assembly as defined in claim 6 wherein said profiled body has at least one profiled groove of T- or L-shaped cross section and extending transverse to a longitudinal axis of said release pin, said profiled groove being adapted to slidingly receive a matingly shaped profiled ledge of the said structural member.

8. A mounting assembly as defined in claim 7 wherein a bottom surface of said profiled groove has ribs for compensating manufacturing tolerances of said locking member and said structural member.

9. A mounting assembly as defined in claim 5 wherein said profiled body and said locking arm are of mirror symmetrical design with respect to a central plane extending through an axis of said mounting assembly.

10. A mounting assembly as defined in claim 5 wherein said release pin has an axially extending projection provided on one end thereof, said projection extending through a through-hole of said profiled body so as to engage said locking arm in order to deflect said locking arm for releasing said first and second locking portions from being lockingly engaged when said release pin is axially displaced.

11. A mounting assembly as defined in claim 1 wherein said mounting portion of said locking member comprises an annular flange and a plurality of spring legs axially spaced therefrom, said spring legs being adapted to be deflected radially inwards for inserting said first mounting portion into a receiving opening of said support member and thereafter to be re-deflected in order to clamp said support member between said spring legs and said annular flange.

12. A mounting assembly as defined in claim 11 wherein said annular flange of said first mounting portion of said locking member is of concave arcuate shape towards said spring legs and has a periphery provided with a sealing lip to be urged resiliently against said support member.

13. A mounting assembly as defined in claim 1 wherein said locking member and said release pin each are of one-piece structure and are made by injection molding.

14. A mounting assembly as defined in claim 1 wherein said locking member and said release pin each are made of plastic material.

15. A mounting assembly for releasably mounting a structural member to a plate-shaped support member, said mounting assembly comprising:
  a locking member comprising:
    a sleeve-like mounting portion adapted to be fixed to said support member, and
    a first locking portion integrally joined to said mounting portion, said first locking portion including a profiled body for receiving said second locking portion of said structural member, and a locking arm resiliently and pivotally connected to said profiled body such that the first locking portion is adapted to snappingly engage a matingly shaped second locking portion of said structural member for retaining said structural member, and
  a release pin axially slidable in said sleeve-shaped mounting portion of said locking member, said release pin having a shaft portion axially project from said sleeve-shaped mounting portion and being adapted to be axially displaced for releasing said first and second locking portions from being snappingly engaged, wherein said release pin has an axially extending projection provided on one end thereof, said projection extending through a through-hole of said profiled body so as to engage said locking arm in order to deflect said locking arm for releasing said first and second locking portions from being lockingly engaged when said release pin is axially displaced.

\* \* \* \* \*